W. Gilman,
Corn Planter,
Nº 100,748. Patented Mar. 15, 1870.
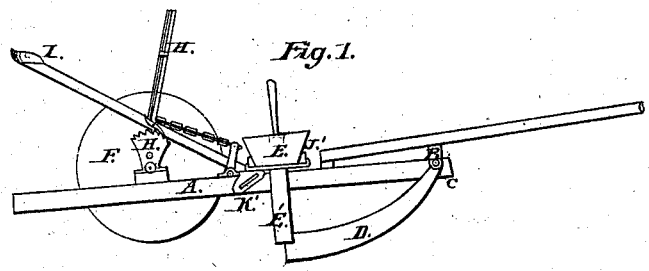
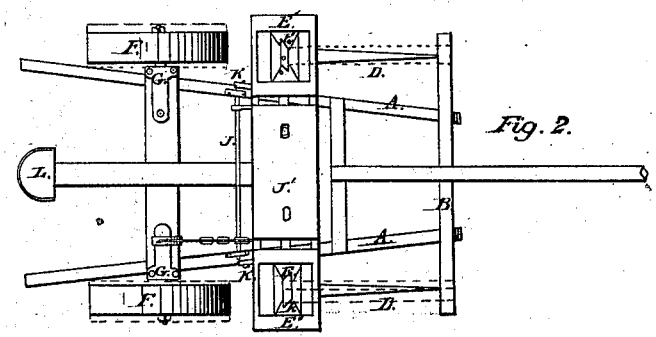
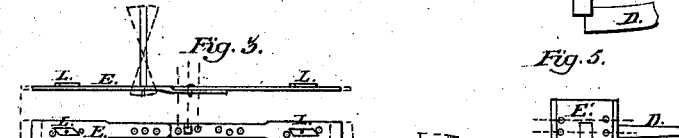
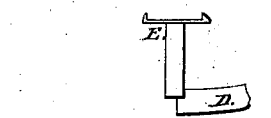
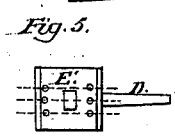
Witnesses:
Edward Rose
C. S. C. Crane
Inventor:
Wm Gilman

United States Patent Office.

WILLIAM GILMAN, OF OTTAWA, ILLINOIS.

Letters Patent No. 100,748, dated March 15, 1870.

---

IMPROVEMENT IN CORN-PLANTERS.

---

The Schedule referred to in these Letters Patent and making part of the same.

---

*To all whom it may concern:*

Be it known that I, WILLIAM GILMAN, of Ottawa, in the county of La Salle, in the State of Illinois, have invented a new and improved Corn-Planter; and I do hereby declare that the following is a clear and exact description thereof, reference being had to the accompanying drawings and to the letters of reference marked thereon.

The nature of my invention consists in constructing a corn-planter in such a manner that the width of the rows of corn can be regulated according to the wishes of the farmer using it.

My invention also consists in so arranging a combination of levers, chain, and rock-shaft, that the seed may be deposited into the soil to a depth more or less, and easily adjustable, and by which, also, the runners may be lifted out of the ground in turning at the end of a row.

To enable others skilled in the art to make and use my invention, I will proceed to describe its construction and operation.

Figure 1 in the drawings is a vertical section.

Figure 2 is a horizontal plan.

Figure 3 is a detached piece.

Figure 4 shows the mechanism by which the depth to which seed is planted is regulated, and by which the runners are lifted out of the ground.

I construct a frame, A, of timber, the forward end of which has a cross-beam, B.

To this cross-beam are fastened two hangers, C C, having each three slots, into either of which the two runners D D can be set, a long bolt passing through all the three slots.

The slide-bar E, fig. 3, is made of two pieces, overlapping one the other, so that said slide-bar can be lengthened or shortened at will, there being three holes provided for the bolt which holds together the two pieces of the slide-bar E.

Two castings, E' E', fig. 5, from the bottoms of the seed-boxes E'' E'''.

These castings have three holes on each side, into either of which a bolt can be passed to fasten them to the seed-box frame J' in such a manner as to correspond with the distance between the runners D D.

As it is also necessary that the two main wheels F and F' should follow directly in the track made by the runners D D, in order to compress the ground into which the seed has been dropped, said wheels F F' have, therefore, adjustable axles, which are covered by axle-caps, G G. When it is desired to change the distance between the two wheels F F', the bolts holding down the axle-caps G G are loosened, the wheels are set in their position, and the bolts are then tightened again.

A ratchet and pawl, H, with a lever, H', fig. 4, is adapted between the wheels F F' at a convenient distance from the seat I.

The lever H' is connected by a chain to a rock-shaft, J, and this rock-shaft communicates the motion it receives from the lever H' to the seed-box frame J', which can by this means be raised and lowered, carrying with it the two runners D D, thus making it easy to plant deep or shallow, and raise the runners D D out of the ground in turning at the end of the rows or in moving about.

In order to more securely hold the runners D D in a certain position, I have provided two rests, K K, which move up and down obliquely, and are fastened by a bolt at any desired elevation, when the seed-box frame J' is allowed to rest on it. The oblique slots of these rests K K are intended to rest on a bolt and a guide-pin, so that their fastening does not altogether depend on the tightening of a bolt.

The dropping device in common use, E, fig. 3, is, however, provided with small caps, L L, which may be made separately, and fastened onto the dropping-plate, or they may be cast on. These caps L L are beveled, with the inclined side toward the hole which receives the corn. As the cap L moves through the corn, the effect of the beveled ends is to move the kernels into the hole in the same manner as the moldboard of a plow heaves up the earth and throws it to one side, tending to fill the holes more perfectly, and drop a uniform number of grains.

I do not claim, broadly, the lateral adjustment of the wheels by a divided axle, nor the lateral adjustment of the runners and seed-boxes, for I am aware that this has been previously accomplished; but What I do claim is—

1. The combination and arrangement of the short axles G G and caps G' G', in combination with the adjustable slide-bar E, when made in two pieces, as shown, the seed-box bottoms E E', and the slotted hangers C C, substantially as described in the foregoing specification.

2. The ratchet and pawl H and lever H', fig. 4, in combination with the seat I, the rock-shaft J, and the seed-box frame J', substantially as and for the purposes described.

3. The two rests K K, with oblique slots, when adapted to a corn-planter, substantially as and for the purpose described.

4. The caps L L, in combination with the slide-bar E, substantially as and for the purpose described in the foregoing specification.

WM. GILMAN.

Witnesses:
EDWARD ROSE,
C. S. C. CRANE.